Patented Mar. 10, 1953

2,630,617

UNITED STATES PATENT OFFICE 2,630,617

ALUMINA PEBBLE

Sam P. Robinson, Bartlesville, Okla., assignor to Phillips Petroleum Company, a corporation of Delaware No Drawing. Application December 28, 1948, Serial No. 67,771

13 Claims. (Cl. 25—156)

The invention relates to the manufacture of high alumina pebbles for use in pebble heaters and in other heat exchange applications. A specific aspect of the invention pertains to a method of manufacturing alumina pebbles having high breakage resistance under severe conditions of cyclic thermal and mechanical shock and high attrition resistance in moving bed types of heat transfer apparatus. The invention also relates to the use of such pebbles in heat-exchange processes wherein heat is absorbed from a gas in one zone by a gravitating mass of pebbles and delivered to another gas in a second zone, with recycling of pebbles and concomitant thermal and mechanical shock thereto.

Pebble heater techniques being developed and applied to various gas heating and reaction processes at the present time make use of a compact stream of small refractory pebbles as a moving heat-exchange medium. These pebbles which are usually ceramic materials, although they may be metallic for some applications, are generally spheres ranging in size from about ⅛" to 1" in diameter. They may be either catalytic or non-catalytic in a given application. In typical pebble heater operation, a continuous compact mass of pebbles descends by gravity through a series of treating zones and upon emerging from the lowermost zone, they are elevated by a suitable elevator, usually of the bucket type, to a point above the uppermost zone for again gravitating through the system. The uppermost zone is usually a pebble heating zone where the pebbles are contacted in countercurrent flow with a stream of hot combustion gas so as to raise the temperature of the pebbles to a desired degree as the pebbles descend through the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper, where the pebbles are contacted with the effluent from the reaction zone so as to recover a substantial portion of the sensible heat thereof and simultaneously quench the reaction product.

In another type of pebble heat-exchange process, a gravitating mass of pebbles is utilized to maintain a cold zone or to cool a gas. The pebbles are cooled by contact with a cold gas in one chamber and the cold pebbles are then gravitated through a second chamber in contact with the gas to be cooled. In such processes the pebbles undergo great differences in temperature with the usual mechanical shock and attrition forces involved in gravitating masses of pebbles.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates of as much as 1000° F. per minute and cooling rates of more than 2000° F. per minute at maximum temperatures in the neighborhood of 3000° F. In addition to the severe shock resulting from such rapid temperature changes, the pebbles are subjected to considerable mechanical shock and attrition in passing through the apparatus, the former, especially, in the elevator equipment and in dropping from the top of the elevator into the top of the pebble heating zone and the latter in passing through the chambers, the throat or throats between chambers and in the pebble flow-regulating feeder. It is found that considerable breakage and attrition of pebbles occurs when using conventional commercial pebbles under such severe conditions of operation. Pebbles which have been made from powdered alumina, mullite, and similar materials, by wetting the powder and rolling the material in conventional balling equipment until balls of the proper size have been formed, are found to exhibit laminar structure and suffer breakage under the strain of pebble heater operating conditions. Pebbles which are made by slugging and compacting the slugs into spheres do not exhibit this laminar structure and are much more resistant to breakage under pebble heater operating conditions. However, it has been found that even when pebbles have been made by slugging and compacting the slugs into balls, they must be fired at a temperature within a critical range in order to properly bond the pebble crystals and produce a pebble which is rugged under severe conditions of service. Pure alumina pebbles require firing in the range of 3000° to 3150° F. to develop the most rugged pebble as is disclosed in my application Serial No. 23,245, filed April 26, 1948; and it has been found that the metal fluoride-treated alumina pebbles of this invention must be fired within the critical range of 2800° to 3250° F. in order to develop the most effective bond and the most rugged pebble.

The pebbles of the invention are utilized to advantage in such processes as those disclosed in my copending applications Serial No. 651,293, filed March 1, 1946, involving the production of $CS_2$ and Serial No. 662,149, filed April 15, 1946, relating to the cracking of hydrocarbons to hydrogen and coke, as well as the process of the copending application of M. O. Kilpatrick, Serial No. 761,696, filed July 17, 1947, relating to the thermal conversion of hydrocarbons to more desirable hydrocarbons. These processes involve temperature changes of the order of 1000 to 2000° F. per minute, with severe mechanical shock and abrasive forces present.

In a pebble heater process requiring the circulation of between 25,000 and 35,000 pounds of pebbles per hour with a maximum temperature shock of approximately 1000° F. per minute the attrition and breakage loss on the best available commercially produced alumina pebble amounts to at least 200 pounds per day and runs as high as 700 pounds per day. This represents a loss of between 0.8 and 2% per day. The alumina pebbles were selected as the best available commercial pebbles. This substantial loss of pebbles due to attrition and breakage merely emphasizes the need for a rugged, attrition, and shock resistant pebble.

The invention has several objects, viz.,

To provide a high alumina content pebble having high resistance to breakage and abrasion under severe conditions of cyclic thermal and mechanical shock in moving-bed heat exchange processes;

To provide a method of manufacturing thermal and mechanical shock-resistant pebbles free from laminar structure and having high abrasion resistance;

To provide an effective method of bonding the crystals in a high purity alumina pebble;

To provide an alumina pebble with high resistance to attrition loss upon continuous recycling through a heat transfer system;

To provide improved pebble heater heat exchange processes utilizing the improved pebbles of the invention.

Other objects of the invention will become apparent from a consideration of the accompanying disclosure.

The invention is concerned with a method of manufacturing improved high alumina content pebbles and involves incorporating into a substantially pure alumina pebble an alkaline earth metal fluoride in an amount in the range of 0.05 to 2 per cent, based upon the weight of the alumina and thereafter heat treating the pebble at a temperature in the range of 2800 to 3250° F. until the porosity lies in the range of 5 to 20 per cent. This usually requires a heating period of at least 2 hours and may require as much as 24 hours. The incorporation of these metal fluorides into an alumina pebble and heat treating or calcining the pebble in the above temperature range results in a superior type pebble for pebble heater operation in that the pebbles have a much smoother surface and are more abrasion resistant as well as more resistant to fatigue or breakage from thermal and mechanical shock over longer periods of time than pure alumina pebbles prepared by the same process without the inclusion of the metal fluorides in their composition. It is found that the growth of alpha corundum crystals in alumina pebbles during heating and cooling in pebble heater processes causes stresses which ultimately result in pebble breakage. It is also found that alumina pebbles having small alpha corundum crystals have longer life in pebble heater processes than alumina pebbles in which the alpha corundum crystals are relatively large in size. Incorporation of an alkaline earth metal fluoride into the alumina mix from which the pebbles are formed, followed by the heat treatment of the invention, substantially limits the growth and size of the alpha corundum crystals in the finished pebble. The improved pebble characteristics of finer corundum crystals, stabilization against crystal growth, and smoother, more dense pebble surface, result in less abrasion and longer life of the pebbles of this invention.

The alumina for the pebble is preferably in the form of lightly calcined and small alpha corundum crystals and should be at least 99%, and preferably 99.5% pure alumina. A typical analysis of alpha corundum suitable for the process is as follows:

| | Per cent |
|---|---|
| $Al_2O_3$ | 99.5 |
| $Na_2O$ | 0.20 |
| $Fe_2O_3$ | 0.25 |
| $SiO_2$ | 0.05 |

However, the alpha corundum may be made from any aluminum oxide material by suitable purification and is preferably precalcined at a temperature in the range of 1800 to 2200° F. for best results. Any of the substantially pure alumina hydrates which are readily convertible to alpha corundum upon heating to the above range may be used as the source of the alumina for the pebble. Purified bauxite and the alumina manufactured by the Bayer process are examples of suitable raw materials for the alumina.

The alkaline earth metal fluoride most suitable for the production of improved alumina pebbles is magnesium fluoride, but the other alkaline earth metal fluorides, including those of calcium, barium, strontium, and mixtures thereof, as well as mixtures with magnesium fluoride in a total amount in the range of 0.05 to 2 per cent by weight of the alumina, produce greatly improved alumina pebbles. A preferred range of quantity of metal fluoride to be incorporated in alumina pebbles is in the range of 0.25 to 1 per cent based on the weight of the alumina. This narrower range of metal fluoride results in pebbles having optimum abrasion and fatigue resistance.

The exact composition of the finished alumina pebbles of the invention after heat treatment at the temperatures specified is not known, but it is believed that some reaction between the metal fluorides and the alumina occurs during the heat treatment so as to form complexes containing both alumina and the alkaline earth metal in combination with fluorine. It is also believed that the metal fluorides become fluid before the softening point of the alpha corundum crystals is reached and that this fluid state of the metal fluorides interspersed between the alpha corundum crystals has a significant effect upon the retardation of crystal growth and limits the crystal size of the alumina to less than about 20 to 25 microns. However, I do not wish to be bound by any theory as to how the magnesium fluoride functions and as to the final composition, other than the fact that the pebbles consist of at least 95 per cent alumina and can be made only by incorporating the specified amount of metal fluoride in a pure alumina pebble and subjecting the pebble to an extended heat treatment of at least two hours in the range of 2800° to 3250° F. and until the porosity of the pebbles lies in the range of 5 to 20 per cent.

Manufacturing pebbles according to the invention entails forming a plastic homogeneous mix or stiff paste consisting essentially of alumina, finely comminuted to at least 150 and preferably 325 mesh or finer, and 1 or more of the alkaline earth metal fluorides in an amount not exceeding 2 per cent by weight of the alumina. It is desirable to include in the mix an organic plasticizing agent and/or a low temperature organic bonding agent in amounts up to 8 to 10 per cent of the weight of the alumina. Any of the conventional low temperature organic bonding or binding agents of the pelleting art are suitable for this purpose as well as the conventional organic plasticizing agents. Some of the conventional bonding agents also serve as plasticizing agents and it is feasible to use one agent for both purposes, one of this particular class of materials being Sterotex (hydrogenated corn oil). Water may be added to the raw materials to produce a mix containing about 10 to 20 per cent water. The chief requirement for this phase of the pebble manufacturing process is that a compactable, plastic homogeneous mix be formed which is readily compactable into dense balls which retain their form during the subsequent drying step. Any plasticizing and bonding agents may be utilized in this phase of the process which contribute to such a result and are readily removed without deleterious results during the calcining step so as to leave a pebble consisting of relatively pure alumina and any alumina-metal fluoride complex or complexes formed in the calcining process. The water content of the mix may be adjusted during the mixing or any time before the forming or compacting step. If too much water is added so as to raise the water content above 20 per cent or if it is desired to extrude the material at a moisture content lower than 20 per cent but in the range of 10 to 20 per cent, the mix may be dried to the desired water content and again mixed to uniform consistency before extrusion.

A preferred method of forming the mix into compact spheres is to extrude the mix or paste through dies in either a piston or screw type extrusion press into rods or cylinders which are then automatically cut off into short lengths corresponding to the diameter of the rods so as to form slugs. These slugs can then readily be compacted into balls by tumbling or any other similar compacting method which compresses the extruded material into balls free from any consequential air spaces. In other words, the balls formed in the compacting step must be dense and free from void spaces. Drying the paste to a moisture content between 10 and 20 per cent by weight is necessary in order to permit proper extrusion of the paste. Deairing is very desirable in augur type extrusion presses, but is not important in piston type presses. When making $\frac{5}{16}''$ pebbles, extrusion of the plastic mix into $\frac{3}{8}''$ rods followed by cutting the rods into $\frac{3}{8}''$ slugs permits the compacting of the slugs into approximately $\frac{3}{8}''$ balls which then fire to $\frac{5}{16}''$ pebbles. High pressure extrusion of this type, with or without deairing of the feed, is much preferred to other methods of preparing the slugs for the pebble balling operation to follow inasmuch as a homogeneous body results with minimum variations in structure after firing. However, other methods of preparing the slugs are within the scope of the invention.

The moisture content of the alumina paste during the extrusion step is important because when it amounts to much less than about 10 per cent, the slugs formed from the extruded rods are not completely homogeneous in structure and will result in the formation of an inferior pebble. If the moisture content greatly exceeds about 20 per cent, the extruded rod is too sticky and the slugs cannot be handled properly in the subsequent balling step.

In a preferred modification of the pebble forming process the paste or mix is dried to a water content in the range of 15% to 20%, preferably 16% to 18%, extruded and cut into slugs, and then dried to a water content between 10% and 15%, preferably 11.5% to 13%, before balling the slugs. The drying step intermediate the extrusion and ball forming step produces more uniform pebbles.

When the mix is extruded, slugged, and balled without an intermediate drying step, it is generally desirable to pass a stream of drying gas over the slugs during the ball forming step so that the moisture content is gradually lowered as the balls are compacted.

Compacting of the alumina slugs into balls or pebbles can be performed in several ways. Rolling of the slugs in a balling machine utilizing three dimensional rotation in a cylindrical drum placed at angles to all three axes of conventional rotary equipment is found to make the most suitable pebbles after firing. The balls are more firmly compacted and more nearly spherical in shape than when made by any other known method. This is probably due to the fact that the slugs are rolled in all directions during the rolling or compacting step. The resulting spherical pebbles with proper moisture content do not stick together and may be stored temporarily or transferred directly to the next step which is the drying operation. Drying to at least 1 weight per cent and preferably to zero moisture content in low temperature drying equipment below about 325° F. is essential to prevent warpage and cracking from fast heating in the calcining operation.

Firing or calcination of the pebbles can be suitably effected in any conventional equipment which results in maintaining the entire mass of pebbles at an even temperature in the range specified during the calcination or commercial firing of the pebbles. Firing in continuous shaft kilns produces pebbles which are less suitable for service in pebble heater operation because they are not uniformly heated in all parts of the bed, a large proportion being either underfired or overfired. The former are not strong and stand up poorly to heat and mechanical shock and to attritive conditions, while the latter are too rigid and soon develop cracks along large crystal faces thereby resulting in early breakage as well as excessive attrition in service. Much more uniform heating is obtained in periodic reverberatory kilns and continuous tunnel kilns, and the pebbles heated therein are superior to those fired in shaft kilns.

To illustrate the invention, the following example is presented:

*Example*

350 lbs. of 150 to 400 mesh hydrous alumina, 650 lbs. of alpha corundum of similar particle size, 7.6 lbs. of MgF$_2$ and 50 lbs. of Sterotex (hydrogenated corn oil) are thoroughly mixed to a homogeneous mass.

The raw materials are fed to milling pans where water is added to produce a stiff paste containing about 16% moisture. Plows discharge this stiff paste to a combination mixing, stirring, slicing conveyor which transfers the product to a non-deairing piston extrusion press equipped with automatic slicing knives. The extrusion press and knives produce a cylindrical pellet ⅜″ in diameter by approximately ⅜″ long.

A conveyor belt picks up these slugs and transfers them to a tumbling drum. This drum, circular in cross section and cylindrical in shape, is so placed in a frame that revolves about a horizontal axis that such revolving gives three dimensional tumbling action to the contents of the drum. The drum continuously takes feed and discharges essentially spherical balls. It is air-swept with hot air to maintain 12% moisture in the pebbles discharged. It is designed to give a retention period of at least 20 minutes and preferably 30 minutes for the slugs before they are discharged.

The discharged pebbles are dried in a flue gas dryer at a temperature of about 300° F. to less than 1% moisture content. The dried pebbles are fired to 3100° F. for 12 hours in a periodic kiln. Approximately 20 hours are used to burn these pebbles to 3100° F. and another 32 hours is allowed for them to cool back to handling and storage temperatures.

The calcined balls or pebbles are about ₁₆⁷″ diameter spheres having an average crushing strength in excess of 800 pounds, a porosity of about 9%, an average alumina grain size between 5 and 6 microns and a maximum grain size of about 20 microns. The pebbles have exceedingly smooth and impervious surfaces and suffer more than 25% less weight loss in comparable attrition tests than pebbles of 99.5% alumina prepared by the same procedure without the addition of an alkaline earth metal fluoride. The pebbles of the example also suffer more than 21% less breakage in cyclic thermal and mechanical shock tests than the 99.5% alumina pebbles. The attrition and breakage tests referred to are those disclosed in my application Serial No. 52,774, filed October 4, 1948.

It can readily be seen that alumina pebbles of the invention, due to the inclusion of an alkaline earth metal fluoride in the mix from which they are compacted and the subsequent heat treatment in the range of 2800° to 3250° F., are considerably improved over alumina pebbles without such treatment and will reduce pebble heater operating costs to an appreciable extent.

Certain modifications of the invention will become apparent to those skilled in the art and the illustrative details disclosed are not to be construed as imposing unnecessary limitations on the invention.

I claim:

1. A method of manufacturing pebbles for moving-bed heat transfer purposes which comprises forming an intimate, plastic, compactable mix consisting essentially of finely comminuted alumina, a volatile plasticizer, and at least one alkaline earth metal fluoride in an amount in the range of 0.05 to 2% by weight of the alumina, compacting the mixture into balls, and calcining the balls at a temperature between 2800° and 3250° F. for a period of at least 2 hours and until their porosity lies in the range of 5 to 20%.

2. The process of claim 1 in which the metal fluoride comprises magnesium fluoride.

3. The process of claim 1 in which the metal fluoride comprises calcium fluoride.

4. The process of claim 1 in which the metal fluoride comprises barium fluoride.

5. A method of manufacturing pebbles for moving-bed heat transfer purposes which comprises compacting ⅛″ to 1″ balls from an intimate, plastic, aqueous, compactable mix consisting essentially of alumina of at least 100 mesh fineness and at least one alkaline earth metal fluoride in an amount in the range of 0.05 to 2% by weight of the alumina; slowly drying said balls to a water content below 1% by weight so as to avoid forming cracks therein; and calcining the dry balls at a temperature in the range of 2800° to 3250° F. for at least 2 hours and until their porosity lies in the range of 5 to 20%.

6. A method of manufacturing pebbles for moving-bed heat transfer purposes which comprises forming an intimate plastic, aqueous, compactable mix consisting essentially of finely comminuted alumina of at least 99% purity and at least one alkaline earth metal fluoride in an amount in the range of 0.05 to 2% by weight of said alumina; adjusting the water content of said mix to the range of 10 to 20% by weight; compacting the mix into ⅛″ to 1″ balls; slowly drying the balls to a water content below 1% so as to avoid forming cracks therein; and calcining the dried balls at a temperature of 2800° to 3250° F. for at least 2 hours and until their porosity lies in the range of 5 to 20%.

7. The process of claim 6 in which said compacting step comprises extruding the mix into rods ⅛″ to 1″ in cross-section, cutting the rods into slugs of a length corresponding to their cross-section, and compacting the slugs into balls.

8. A method of manufacturing pebbles for moving-bed heat transfer purposes which comprises forming an intimate plastic, aqueous, compactable mix consisting essentially of 150–400 mesh alumina of at least 99% purity and at least one alkaline earth metal fluoride in an amount in the range of 0.25 to 1% by weight of said alumina; adjusting the water content of said mix to the range of 15 to 20% by weight; extruding the mix into ⅛″ to 1″ rods and cutting the rods into slugs of a length approximating their diameter; drying the slugs to a water content in the range of 10 to 15% by weight; compacting the slugs into balls by three dimensional tumbling; slowly drying the balls to a water content below 1% by weight at a temperature below 325° F. so as to avoid the formation of cracks therein; and calcining the dried balls at a temperature in the range of 2900° to 3150° F. for at least 2 hours and until their porosity lies in the range of 8 to 15%.

9. The method of improving the abrasion and fatigue resistance of high alumina content pebbles in pebble heater type of operations, which comprises uniformly dispersing at least one alkaline earth metal fluoride in an amount in the range of 0.05 to 2% by weight of the alumina in a plastic, compactable mix consisting essentially of alumina of at least 99 weight per cent purity and a volatile plasticizer; compacting the mix into ⅛″ to 1″ balls; and calcining the balls at a temperature in the range of 2800 to 3250° F. for at least 2 hours and until their porosity lies in the range of 5 to 20%.

10. A hard, smooth, generally spherical, heat-exchange pebble consisting essentially of alumina and at least one alkaline earth metal fluoride in an amount in the range of 0.05 to 2% by weight of the alumina, said pebble having been made by the process of claim 1.

11. The pebble of claim 10 in which the fluoride is magnesium fluoride.

12. The pebble of claim 10 in which the fluoride is calcium fluoride.

13. The pebble of claim 10 in which the fluoride is barium fluoride.

SAM P. ROBINSON.

REFERENCES CITED

The following references are of record in the file of this patent:

UNITED STATES PATENTS

| Number | Name | Date |
|---|---|---|
| 1,037,999 | Saunders | Sept. 10, 1912 |
| 2,035,845 | Stanton | Mar. 31, 1936 |
| 2,195,950 | Wood | Apr. 2, 1940 |
| 2,316,726 | Spicer et al. | Apr. 13, 1943 |
| 2,432,520 | Ferro, Jr. | Dec. 16, 1947 |